(12) United States Patent
Ohmori et al.

(10) Patent No.: US 10,883,860 B2
(45) Date of Patent: Jan. 5, 2021

(54) OPTICAL FIBER SENSOR

(71) Applicant: FUJIKURA LTD., Tokyo (JP)

(72) Inventors: Kenichi Ohmori, Sakura (JP); Koji Omichi, Sakura (JP); Shingo Matsushita, Sakura (JP); Kentaro Ichii, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/485,096

(22) PCT Filed: Dec. 8, 2017

(86) PCT No.: PCT/JP2017/044173
§ 371 (c)(1),
(2) Date: Aug. 9, 2019

(87) PCT Pub. No.: WO2018/150699
PCT Pub. Date: Aug. 23, 2018

(65) Prior Publication Data
US 2020/0041313 A1    Feb. 6, 2020

(30) Foreign Application Priority Data

Feb. 15, 2017    (JP) .................. 2017-026270

(51) Int. Cl.
*G01B 11/16*    (2006.01)
*G02B 6/02*    (2006.01)
*G01D 5/353*    (2006.01)

(52) U.S. Cl.
CPC ........... *G01D 5/353* (2013.01); *G01B 11/161* (2013.01); *G02B 6/02028* (2013.01); *G02B 6/02076* (2013.01)

(58) Field of Classification Search
CPC ................................................... G01B 11/161
See application file for complete search history.

(56) References Cited

U.S. PATENT DOCUMENTS 8,116,601 B2    2/2012   Prisco
8,630,515 B2    1/2014   Childers et al.
(Continued)

FOREIGN PATENT DOCUMENTS

JP    2006-003197 A    1/2006
JP    2008-175560 A    7/2008
(Continued)

OTHER PUBLICATIONS

P.S. Westbrook et al., "Integrated optical fiber shape sensor modules based on twisted multicore fiber grating arrays"; Proceedings of SPIE, vol. 8938; Optical Fibers and Sensors for Medical Diagnostics and Treatment Applications XIV; Feb. 20, 2014 (7 pages).
(Continued)

*Primary Examiner* — Eric Wong
(74) *Attorney, Agent, or Firm* — Osha Bergman Watanabe & Burton LLP

(57) ABSTRACT

An optical fiber sensor includes: a central core disposed at a center of an optical fiber; and an outer peripheral core that spirally surrounds the central core. The effective refractive index $n_{e2}$ of the outer peripheral core is lower than the effective refractive index $n_{e1}$ of the central core. A ratio between the effective refractive index $n_{e2}$ and the effective refractive index $n_{e1}$ matches a ratio between an optical path length of the central core and an optical path length of the outer peripheral core.

7 Claims, 3 Drawing Sheets

(56) References Cited

U.S. PATENT DOCUMENTS

| | | | |
|---|---|---|---|
| 8,773,650 B2 | 7/2014 | Froggatt et al. | |
| 9,417,057 B2 | 8/2016 | 'T Hooft et al. | |
| 10,429,584 B2* | 10/2019 | Muendel | G02B 6/262 |
| 2013/0301998 A1* | 11/2013 | Hayashi | G02B 6/02042 |
| | | | 385/100 |
| 2017/0299806 A1* | 10/2017 | Kopp | G02B 6/02042 |
| 2017/0370704 A1* | 12/2017 | Froggatt | G01L 1/242 |
| 2018/0195856 A1 | 7/2018 | Reaves et al. | |

FOREIGN PATENT DOCUMENTS

| | | |
|---|---|---|
| JP | 2010-185729 A | 8/2010 |
| JP | 2012211964 A | 11/2012 |
| JP | 5232982 B2 | 7/2013 |
| JP | 5413931 B2 | 2/2014 |
| JP | 2018132421 A | 8/2018 |
| WO | 2016/099976 A1 | 6/2016 |
| WO | 2016/122742 A2 | 8/2016 |

OTHER PUBLICATIONS

Luna Innovations Incorporated, "LUNA Fiber Optic Shape Sensing"; Document #SS00021-D-TS, Revision 003; Jun. 21, 2013 (6 pages).

Notice of Allowance issued in corresponding Japanese Patent Application No. JP2017-026270 dated May 29, 2018 (3 pages).

Fini, John M., et al. "Crosstalk in multicore fibers with randomness: gradual drift vs. short-length variations." Optics Express, vol. 20, No. 2, p. 949-959, 2012. (11 pages).

* cited by examiner

OPTICAL FIBER SENSOR

CROSS-REFERENCE TO RELATED APPLICATIONS

This is a U.S. national stage application of International Application No. PCT/JP2017/044173, filed on Dec. 8, 2017, which claims priority from Japanese Patent Application No. 2017-026270, filed on Feb. 15, 2017. The contents of these applications are incorporated herein in their entirety.

TECHNICAL FIELD

The present invention relates to an optical fiber sensor.

BACKGROUND

In the related art, optical fiber sensors for measuring various physical quantities (for example, stress, strain, temperature, or the like) using an optical fiber as a sensor are known. The optical fiber sensor measures the various physical quantities described above, based on the light reception result obtained by causing light to be incident from the first end portion of the optical fiber as a sensor and receiving transmitted light (or scattered light) to be emitted from the second end portion of the optical fiber or reflected light (or scattered light) to be emitted from the first end portion. Representative examples of such an optical fiber sensor include an FBG type optical fiber sensor, a scattered light type optical fiber sensor, or the like.

In the FBG type optical fiber sensor, Fiber Bragg Grating (FBG) is formed in the core of the optical fiber. The FBG type optical fiber sensor is used for measuring the distribution of various physical quantities in the longitudinal direction of the optical fiber by utilizing the characteristic of the FBG that the reflection characteristic of the FBG varies according to the surrounding environment. Incidentally, the FBG type optical fiber sensor is used, for example, in optical frequency domain reflectometry (OFDR).

In the scattered light type optical fiber sensor, an ordinary optical fiber on which FBG or the like is not formed is used as a sensor. The scattered light type optical fiber sensor is used for measuring the distribution of various physical quantities in the longitudinal direction of the optical fiber by utilizing the characteristic that the scattered light (for example, Rayleigh scattered light) generated in the optical fiber varies according to the surrounding environment.

Patent Documents 1 and 2 below disclose methods for measuring strain occurring in, for example, a structure by OFDR using an FBG type optical fiber sensor. Further, Patent Documents 3 to 6 and Non-Patent Documents 1 and 2 below disclose an optical fiber sensor in which an FBG is formed in a multi-core fiber having a plurality of cores. For example, in the following Non-Patent Document 2, the shape of the optical fiber sensor (shape of a structure to which the optical fiber sensor is attached) is measured by OFDR.

Here, for example, the above-described multi-core fiber is an optical fiber having a core (central core) formed at a center of an optical fiber and a plurality of cores (outer peripheral cores) formed so as to spirally surround the central core. For example, three outer peripheral cores are disposed with an interval of 120°. In Patent Documents 3 to 6 and Non-Patent Documents 1 and 2 below, an FBG is formed in each core of such a multi-core fiber.
[Patent Document 1] Japanese Patent No. 5232982
[Patent Document 2] Japanese Patent No. 5413931
[Patent Document 3] U.S. Pat. No. 8,116,601
[Patent Document 4] U.S. Pat. No. 8,630,515
[Patent Document 5] U.S. Pat. No. 8,773,650
[Patent Document 6] U.S. Pat. No. 9,417,057
[Non-Patent Document 1] P. S. Westbrook et al., "Integrated optical fiber shape senor modules based on twisted multicore fiber grating arrays", Proc. SPIE 8938, Optical Fibers and Sensors for Medical Diagnostics and Treatment Applications XIV, 89380H (Feb. 20, 2014)
[Non-Patent Document 2] "LUNA Fiber Optic Shape Sensing", Document #: SS00021-D-TS, Luna Innovations Incorporated, Jun. 21, 2013

In the above-described multi-core fiber having the central core and the outer peripheral core, the central core is parallel to the axis of the optical fiber, so the optical path of the central core is linear. On the other hand, since the outer peripheral core is spirally wound, the optical path length of the outer peripheral core is longer than the optical path length of the central core. Therefore, when such a multi-core fiber is used as an optical fiber sensor, a positional deviation occurs between the measurement point of the central core and the measurement point of the outer peripheral core. For example, in the configuration of the multi-core fiber disclosed in the above-described Non-Patent Document 1, when the fiber length is 2 [m], the distance between the cores is 35 [μm], and the number of spirals of the outer peripheral core per unit length is 50 [Turn/m], the optical path length difference between the central core and the outer peripheral core from the first end portion to the second end portion of the optical fiber is about 120 [μm].

Here, in the OFDR, the resolution in the longitudinal direction of the fiber is, for example, about 40 [μm]. Therefore, when a multi-core fiber in which the outer peripheral core is spirally wound around the central core is used as the optical fiber sensor, the positional accuracy in the longitudinal direction is deteriorated by the optical path length difference between the central core and the outer peripheral core. In particular, when the length of the optical fiber sensor is increased, the position error due to the optical path length difference between the center core and the outer peripheral core is accumulated and increased, and it becomes difficult to secure the measurement accuracy over the entire length of the optical fiber sensor.

SUMMARY

One or more embodiments of the present invention provide high measurement accuracy over the entire length of an optical fiber sensor, even when the length of the optical fiber sensor is increased.

An optical fiber sensor according to one or more embodiments of the present invention includes a central core that is formed at a center of an optical fiber; and at least one outer peripheral core that is formed so as to spirally surround the central core, wherein when a distance between the central core and the outer peripheral core is d, and the number of spirals of the outer peripheral core per unit length is $f_w$, an effective refractive index $n_{e1}$ of the central core and an effective refractive index $n_{e2}$ of the outer peripheral core satisfy the following Expression (1).

$$n_{e1} \times \left(\frac{1}{f_w} - B\right) < n_{e2} \times \left(\frac{1}{f_w} + A\right) < n_{e1} \times \left(\frac{1}{f_w} + B\right) \quad (1)$$

Here,

-continued $$A = \sqrt{\left(\frac{1}{f_w}\right)^2 + (2\pi d)^2} - \frac{1}{f_w}$$

$$B = \frac{A}{1 + A \cdot f_w}$$

Here, in the optical fiber sensor, the effective refractive index $n_{e2}$ of the outer peripheral core may be set to be lower than the effective refractive index $n_{e1}$ of the central core so as to match a ratio between the optical path lengths of the central core and the outer peripheral core.

Further, in the optical fiber sensor, a ratio between the effective refractive index $n_{e2}$ of the outer peripheral core and the effective refractive index $n_{e1}$ of the central core may be set so as to satisfy the following Expression (2).

$$\frac{n_{e2}}{n_{e1}} = \frac{\left(\frac{1}{f_w}\right)}{\sqrt{\left(\frac{1}{f_w}\right)^2 + (2\pi d)^2}} \quad (2)$$

Further, in the optical fiber sensor, a ratio between a molar concentration $m_1$ of a dopant to be doped to the central core and a molar concentration $m_2$ of an dopant to be doped to the outer peripheral core may be set so as to satisfy the following Expression (3).

$$\frac{m_2}{m_1} = \frac{\left(\frac{1}{f_w}\right)}{\sqrt{\left(\frac{1}{f_w}\right)^2 + (2\pi d)^2}} \quad (3)$$

Further, in the optical fiber sensor, germanium having the same concentration may be doped as a first dopant to the central core and the outer peripheral core, and a second dopant having an effect of decreasing the refractive index may be doped to the outer peripheral core.

Further, in the optical fiber sensor, an FBG may be formed over an entire length in a longitudinal direction or in a partial region in the longitudinal direction.

According to one or more embodiments of the present invention, the effective refractive index $n_{e1}$ of the central core of the optical fiber sensor and the effective refractive index $n_{e2}$ of the outer peripheral core are set so as to satisfy the above Expression (1). Therefore, the optical path length difference between the central core and the outer peripheral core can be made smaller than the optical path length difference A in the case where the effective refractive indices of the central core and the outer peripheral core are the same. Thus, even when the length of the optical fiber sensor is increased, it is possible to realize high measurement accuracy over the entire length thereof.

DETAILED DESCRIPTION

Figure 1:
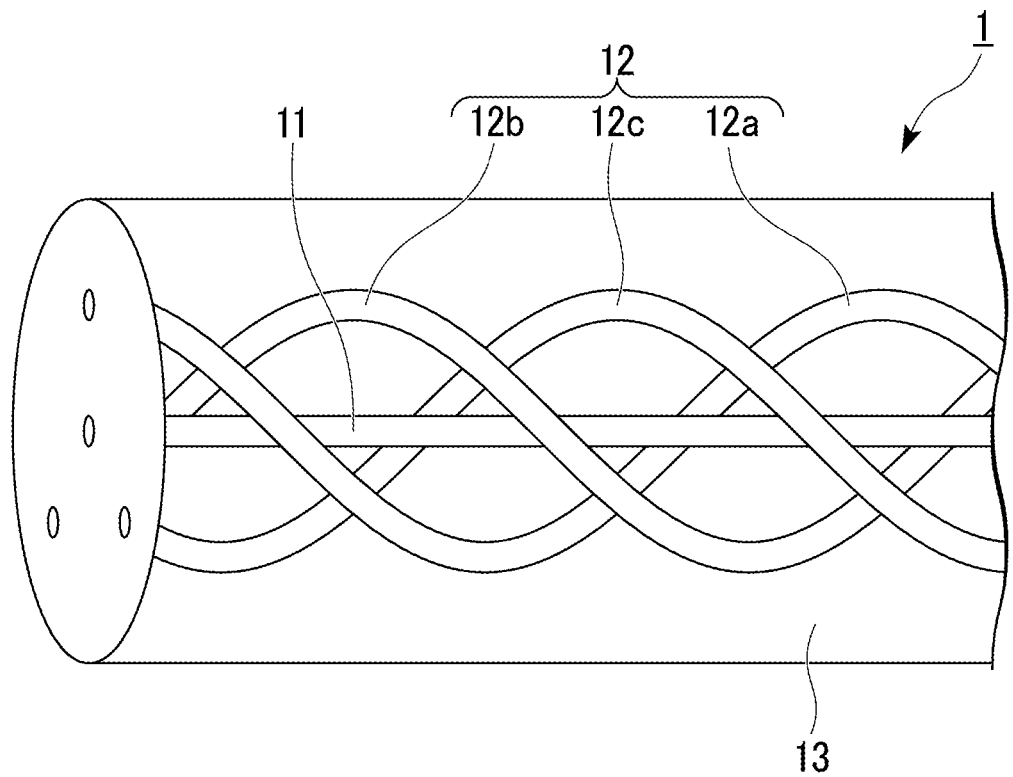
FIG. 1 is a perspective view showing an optical fiber sensor according to one or more embodiments of the present invention.

Hereinafter, embodiments of an optical fiber sensor will be described in detail with reference to the drawings. In the drawings referred to below, in order to facilitate understanding, scales of dimensions of respective members may be appropriately changed and shown as necessary. In the following description, an FBG type optical fiber sensor in which an FBG is formed in the core of an optical fiber will be described as an example. However, the optical fiber sensor is not limited to the FBG type optical fiber sensor, but is also applicable to other optical fiber sensors such as a scattered light type optical fiber sensor.

<Configuration of Optical Fiber Sensor>

Figure 2:
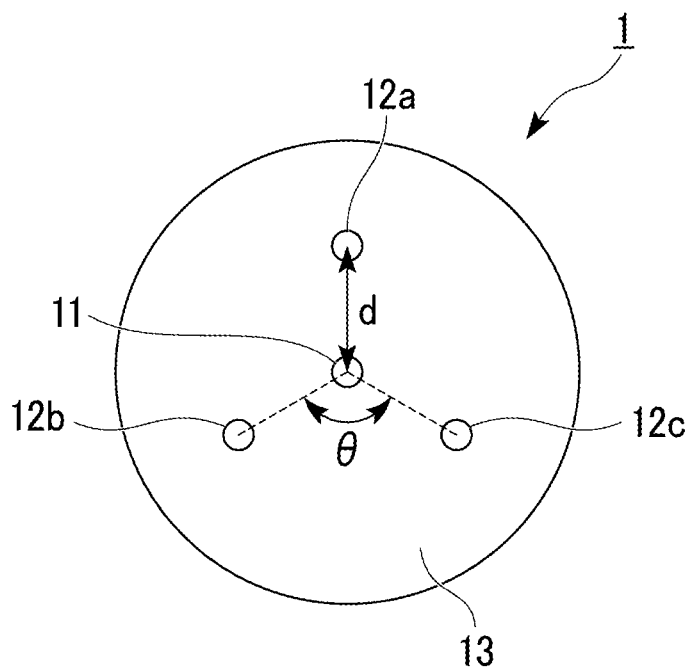
FIG. 2 is a cross-sectional view of the optical fiber sensor according to one or more embodiments of the present invention.

FIG. 1 is a perspective view showing an optical fiber sensor according to one or more embodiments of the present invention. Further, FIG. 2 is a cross-sectional view of the optical fiber sensor according to one or more embodiments of the present invention. As shown in FIGS. 1 and 2, an optical fiber sensor 1 according to one or more embodiments is a multi-core fiber optical fiber sensor including a central core 11, a plurality of outer peripheral cores 12 (outer peripheral cores 12a to 12c), and a cladding 13. Incidentally, the outer peripheral surface of the cladding 13 may be covered with a coating (not shown).

The central core 11 is a core formed at the center of the optical fiber sensor 1 in parallel with the axis of the optical fiber sensor 1. By this central core 11, an optical path which is linear with respect to the longitudinal direction of the optical fiber sensor 1 is formed at the center of the optical fiber sensor 1. The central core 11 is formed of silica glass containing, for example, germanium (Ge) (first dopant). In addition, FBG is formed over the entire length of the central core 11. The diameter of the central core 11 is set to, for example, 5 to 7 [m].

The outer peripheral core 12 is a core formed to spirally surround the central core 11. In one or more embodiments, the three outer peripheral cores 12a to 12c are separated from each other by a predetermined distance d (see FIG. 2) in the radial direction with respect to the central core 11, and are disposed at intervals of an angle θ (for example, 120°) in a cross section orthogonal to the longitudinal direction. These outer peripheral cores 12a to 12c extend in the longitudinal direction of the optical fiber sensor 1 so as to spirally surround the central core 11 while maintaining a distance of an angle θ from each other (see FIG. 1). These outer peripheral cores 12a to 12c form three spiral optical path surrounding the central core 11 in the optical fiber sensor 1.

Similar to the central core 11, the plurality of outer peripheral cores 12a to 12c are formed of silica glass containing, for example, germanium (Ge) (first dopant). In addition, FBG is formed over the entire length of the outer peripheral cores 12a to 12c. Here, for example, a ratio between the concentration (molar concentration) of germanium to be doped to the central core 11 and the concentration (molar concentration) of germanium to be doped to the outer peripheral cores 12a to 12c is set so as to satisfy a predetermined relationship (details will be described later). The outer peripheral cores 12a to 12c have the same diameter (or substantially the same diameter) as the central core 11, and are set, for example, in the range of 5 to 7 [μm].

This is to adjust the ratio of the effective refractive indices of the central core 11 and the outer peripheral core 12 by adjusting the concentration of germanium, which is a dopant having an effect of increasing the refractive index, and eliminate (or reduce) the optical path length difference between the central core 11 and the outer peripheral core 12. Specific adjustment of the effective refractive indices of the central core 11 and the outer peripheral cores 12a to 12c will be described later.

The distance d between the central core 11 and the outer peripheral cores 12a to 12c is set in consideration of the crosstalk between the cores, the optical path length difference between the central core 11 and the outer peripheral cores 12a to 12c, the strain amount difference between the central core 11 and the outer peripheral cores 12a to 12c when the optical fiber sensor 1 is bent, and the like. For example, in a case where the optical fiber sensor 1 is used for measuring its own shape (shape of a structure to which the optical fiber sensor is attached), it is desirable that the distance between the central core 11 and the outer peripheral cores 12a to 12c is, for example, 35 [μm], and the number of spirals of the outer peripheral core per unit length is, for example, about 50 [turn/m].

The cladding 13 is a common cladding covering the periphery of the central core 11 and the outer peripheral cores 12a to 12c. The outer shape of the cladding 13 is cylindrical. Since the central core 11 and the outer peripheral cores 12a to 12c are covered with the common cladding 13, it can be said that the central core 11 and the outer peripheral cores 12a to 12c are formed inside the cladding 13. The cladding 13 is formed of silica glass, for example.

<Adjustment of Effective Refractive Index>

Figure 3:
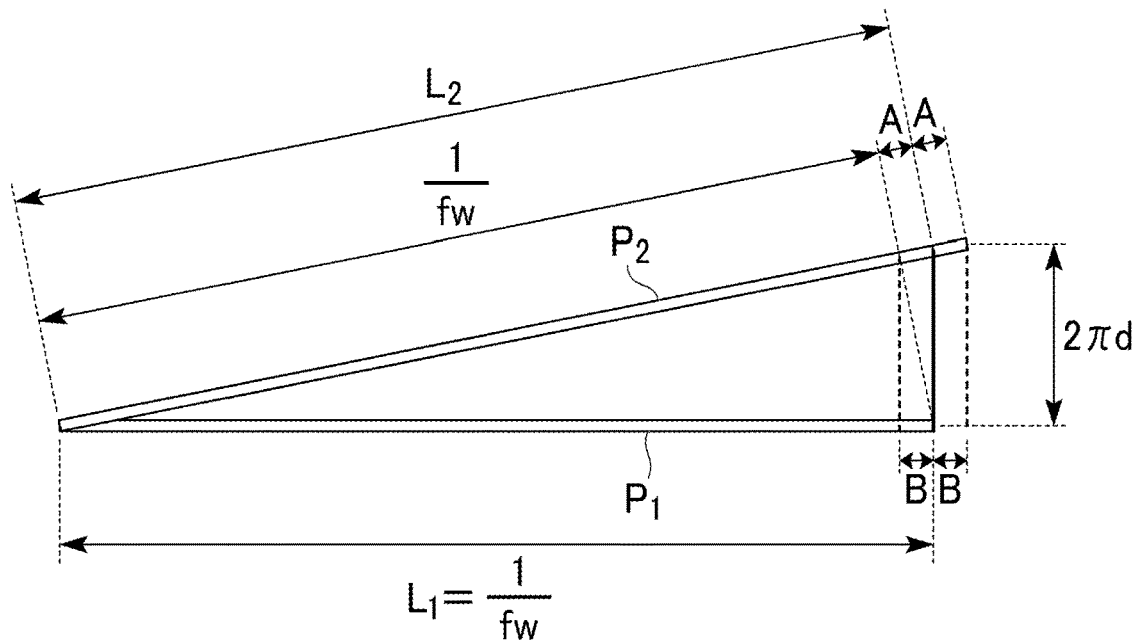
FIG. 3 is a diagram showing an optical path length difference between the central core and the outer peripheral core in one or more embodiments of the present invention.

Next, the adjustment of the effective refractive indices of the central core 11 and the outer peripheral core 12 will be described in detail. FIG. 3 is a diagram showing an optical path length difference between the central core and the outer peripheral core in one or more embodiments of the present invention. In the following description, it is assumed that the distance between the central core 11 of the optical fiber sensor 1 and the outer peripheral core 12 (outer peripheral cores 12a to 12c) is d, and the number of spirals of the outer peripheral core 12 per unit length of the optical fiber sensor 1 is $f_w$.

In FIG. 3, the straight line denoted by reference numeral $P_1$ indicates the central core 11, and the straight line denoted by reference numeral $P_2$ indicates the outer peripheral core 12. However, in FIG. 3, only the central core 11 and the outer peripheral core 12 corresponding to one spiral of the outer peripheral core 12 are shown. Assuming that the optical path length of the central core 11 corresponding to one spiral of the outer peripheral core 12 is $L_1$ and the optical path length of the outer peripheral core 12 corresponding to one spiral of the outer peripheral core 12 is $L_2$, the relationship therebetween is expressed by the following Expression (4).

$$L_2 = \sqrt{L_1^2 + (2\pi d)^2} \qquad (4)$$

Since the outer peripheral core 12 is formed so as to spirally surround the central core 11, in a case where the effective refractive indices of the central core 11 and the outer peripheral core 12 are the same, the optical path length $L_2$ of the outer peripheral core 12 is set to be shorter than the optical path length $L_1$ of the central core 11. Specifically, when the optical path length difference between the central core 11 and the outer peripheral core 12 is denoted by A and the length of the outer peripheral core 12 is denoted by $L_1+A$, the optical path length difference A between the central core 11 and the outer peripheral core 12 is expressed by the following Expression (5).

$$A = \sqrt{\left(\frac{1}{f_w}\right)^2 + (2\pi d)^2} - \frac{1}{f_w} \qquad (5)$$

The length B of the central core 11 corresponding to the optical path length difference A represented by the above Expression (5) (in other words, the length B in the longitudinal direction of the optical fiber sensor 1 having the optical path length difference A) is expressed by the following Expression (6).

$$B = \frac{A}{1 + A \cdot f_w} \qquad (6)$$

Here, the effective refractive index of the central core 11 is denoted by $n_{e1}$, and the effective refractive index of the outer peripheral core 12 is denoted by $n_{e2}$. When the effective refractive indices $n_{e1}$, $n_{e2}$ satisfy the following Expression (7), the optical path length difference between the central core 11 and the outer peripheral core 12 can be made smaller than the optical path length difference A in the case where the effective refractive indices of the central core 11 and the outer peripheral core 12 are the same. That is, by setting the effective refractive index $n_{e1}$ of the central core 11 and the effective refractive index $n_{e2}$ of the outer peripheral core 12 so as to satisfy the following Expression (7), the optical path length difference can be made smaller as compared with a case where the effective refractive indices of the central core 11 and the outer peripheral core 12 are the same. As a result, even when the length is increased, it is possible to realize high measurement accuracy over the entire length thereof.

$$n_{e1} \times \left(\frac{1}{f_w} - B\right) < n_{e2} \times \left(\frac{1}{f_w} + A\right) < n_{e1} \times \left(\frac{1}{f_w} + B\right) \qquad (7)$$

Next, the FBG formed on the central core 11 and the plurality of outer peripheral cores 12 will be discussed. FBGs to be formed on the central core 11 and the plurality of outer peripheral cores 12 are formed at the same cycle along the longitudinal direction of the optical fiber sensor 1. As described above, since the outer peripheral core 12 is formed so as to spirally surround the central core 11, in a case where the effective refractive indices of the central core 11 and the outer peripheral core 12 are the same, the optical path length L2 of the outer peripheral core 12 is set to be shorter than the optical path length L1 of the central core 11.

Therefore, the period of the FBGs formed in the outer peripheral core 12 (the period along the outer peripheral core 12) is longer than the period of the FBGs formed in the central core 11. Assuming that the Bragg wavelength of the FBG formed in the central core 11 is $\lambda_1$ and the Bragg wavelength of the FBG formed in the outer peripheral core 12 is $\lambda_2$, the relationship therebetween is expressed by the following Expression (8).

$$\lambda_2 = \frac{\sqrt{L_1^2 + (2\pi d)^2}}{L_1} \lambda_1 \qquad (8)$$

The Bragg wavelength $\lambda_B$ of the FBG is expressed by the following Expression (9) where Λ is the length of one period of the periodic structure of the refractive index formed in the optical fiber sensor 1 and $n_e$ is the effective refractive index.

$$\lambda_B = 2n_e \Lambda \qquad (9)$$

If the ratio between the effective refractive index $n_{e1}$ of the central core 11 and the effective refractive index $n_{e2}$ of the outer peripheral core 12 is set as shown in the following Expression (10), the ratio between the optical path lengths of the central core 11 and the outer peripheral core 12 is canceled. In the Expression (10), since the right side has a value smaller than 1, the value of the effective refractive index $n_{e2}$ is smaller than the value of the effective refractive index $n_{e1}$. In other words, the effective refractive index $n_{e2}$ of the outer peripheral core 12 is set to be lower than the effective refractive index $n_{e1}$ of the central core 11 so as to match a ratio between the optical path lengths of the central core 11 and the outer peripheral core 12. This makes it possible to set (or reduce) the optical path length difference between the central core 11 and the outer peripheral core 12 and the Bragg wavelength difference between the central core 11 and the outer peripheral core 12 to zero. As a result, even when the length of the optical fiber sensor 1 is increased, it is possible to realize high measurement accuracy over the entire length thereof.

$$\frac{n_{e2}}{n_{e1}} = \frac{\left(\frac{1}{f_w}\right)}{\sqrt{\left(\frac{1}{f_w}\right)^2 + (2\pi d)^2}}. \qquad (10)$$

Incidentally, for example, by adjusting the ratio of germanium to be doped to the central core 11 and the outer peripheral core 12, it is possible to realize the ratio of the effective refractive indices $n_{e1}$, $n_{e2}$ shown in the above Expression (10). Specifically, a ratio between a molar concentration $m_1$ of germanium to be doped to the central core 11 and a molar concentration $m_2$ of germanium to be doped to the outer peripheral core 12 may be set so as to satisfy the following Expression (11).

$$\frac{m_2}{m_1} = \frac{\left(\frac{1}{f_w}\right)}{\sqrt{\left(\frac{1}{f_w}\right)^2 + (2\pi d)^2}} \qquad (11)$$

<Method of Manufacturing Optical Fiber Sensor>

Figure 4:
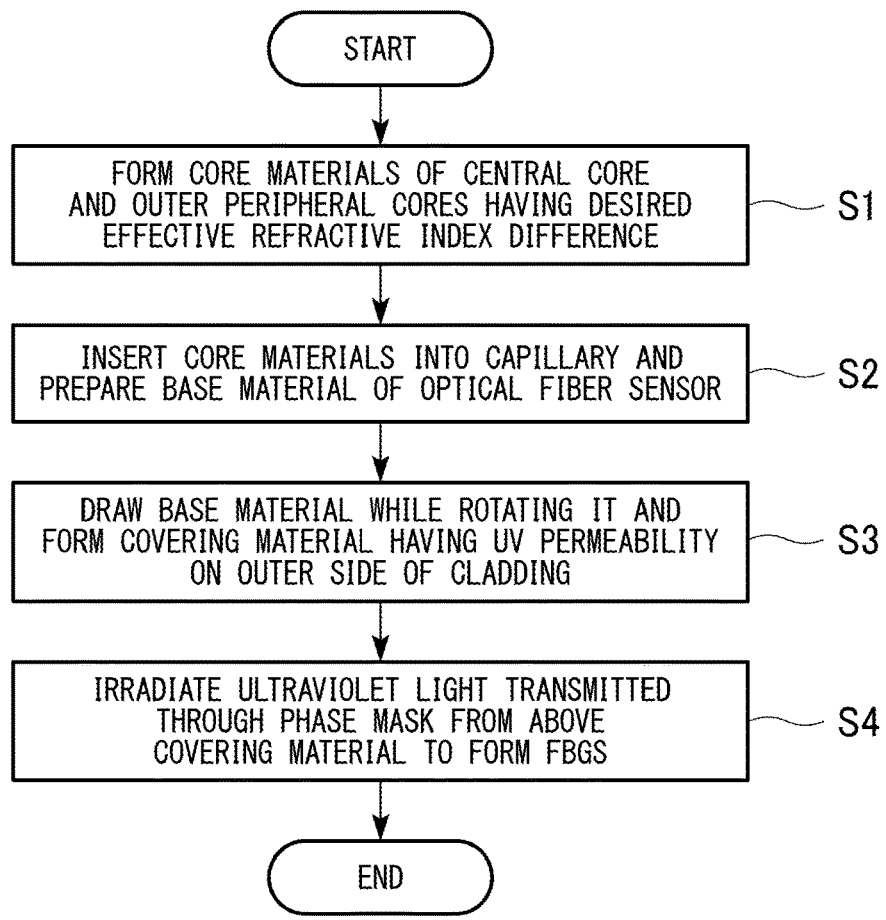
FIG. 4 is a flowchart showing a method of manufacturing the optical fiber sensor according to one or more embodiments of the present invention.

Next, a method of manufacturing the above-described optical fiber sensor will be described. FIG. 4 is a flowchart showing a method of manufacturing the optical fiber sensor according to one or more embodiments of the present invention. In manufacturing an optical fiber sensor, first, a step of forming the core material of the central core 11 and the core material of the outer peripheral core 12 having effective refractive indices different from each other and having an effective refractive index difference is performed (step S1). The number of core materials of the outer peripheral core 12 may be one or more than one.

Specifically, the core material of the central core 11 to which germanium, a dopant having an effect of increasing the refractive index, is doped at a predetermined concentration, and the core material of the outer peripheral core 12 to which germanium is doped at a lower concentration than the core material of the central core 11 are formed. For example, a ratio between a molar concentration $m_1$ of germanium to be doped to the core material of the central core 11 and a molar concentration $m_2$ of germanium to be doped to the core material of the outer peripheral core 12 is adjusted so as to satisfy, for example, the above-described Expression (11). It is desirable to measure the formed core material with a preform analyzer to check whether or not an effective refractive index difference is obtained.

Next, a step of inserting the formed core materials of the central core 11 and the peripheral core 12 into a glass tube (capillary) and preparing a base material of the optical fiber sensor 1 is performed (step S2). Specifically, the base material of the optical fiber is prepared by respectively inserting the core materials of the central core 11 and the outer peripheral core 12 formed in the above step S1 into the capillary having holes formed at positions where the core materials of the central core 11 and the outer peripheral core 12 are to be disposed, and melting and elongating it. The capillary finally becomes the cladding 13 of the optical fiber sensor 1.

Next, a step of drawing the base material while rotating it and forming a covering material having ultraviolet (UV) permeability on the outer side of the cladding is performed (step S3). Specifically, the base material prepared in step S2 is set in a drawing machine, and then the base material is drawn while being rotated by the drawing machine. At this time, a covering material having ultraviolet permeability is formed on the outer periphery of the strand obtained by drawing, that is, on the outer periphery of the cladding 13. Here, the base material is drawn while being rotated in order to make the outer peripheral core 12 spiral. The covering material having ultraviolet permeability is formed on the outer periphery of the cladding in order to form the FBG in the central core 11 and the outer peripheral core 12 by irradiating the optical fiber with ultraviolet rays while winding up the optical fiber.

Subsequently, a step of irradiating ultraviolet light transmitted through the phase mask from above the covering material to form FBGs in the central core 11 and the outer peripheral core 12 is performed (step S4). Since germanium is doped to the central core 11 and the outer peripheral core 12, and the central core 11 and the outer peripheral core 12 are irradiated with ultraviolet light through the phase mask, the germanium doped to the central core 11 and the outer peripheral core 12 reacts with the ultraviolet light. Thereby, FBG having a structure in which the refractive index periodically changes in the longitudinal direction is formed in the central core 11 and the outer peripheral core 12.

Here, in a case where the diameter of the central core 11 and the outer peripheral core 12 is about 5 to 7 [µm], the distance d between the central core 11 and the outer peripheral core 12 is 35 [µm], and the number $f_w$ of spirals of the outer peripheral core per unit length is 50 [turn/m], from the above-described Expression (8), the difference in Bragg wavelength between the central core 11 and the outer peripheral core 12 is about 95 [µm] in the wavelength range of 1.55 µm. The effective refractive index of the core to which germanium is doped is, for example, about 1.48, and the effective refractive index difference of the outer peripheral core 12 for correcting the difference in the Bragg wavelength (the effective refractive index difference of the outer peripheral core 12 with respect to the central core 11) is about 0.0001.

Further, in a case where the distance d between the central core 11 and the outer peripheral core 12 is 50 [µm], and the number $f_w$ of spirals of the outer peripheral core per unit length is 100 [turn/m], from the above-described Expression (8), the difference in Bragg wavelength between the central core 11 and the outer peripheral core 12 is about 770 [µm], which is large. In order to correct this difference in Bragg wavelength, it is necessary to make the effective refractive index difference of the outer peripheral core 12 (the effective refractive index difference of the outer peripheral core 12 with respect to the central core 11) about 0.0007.

Figure 5:
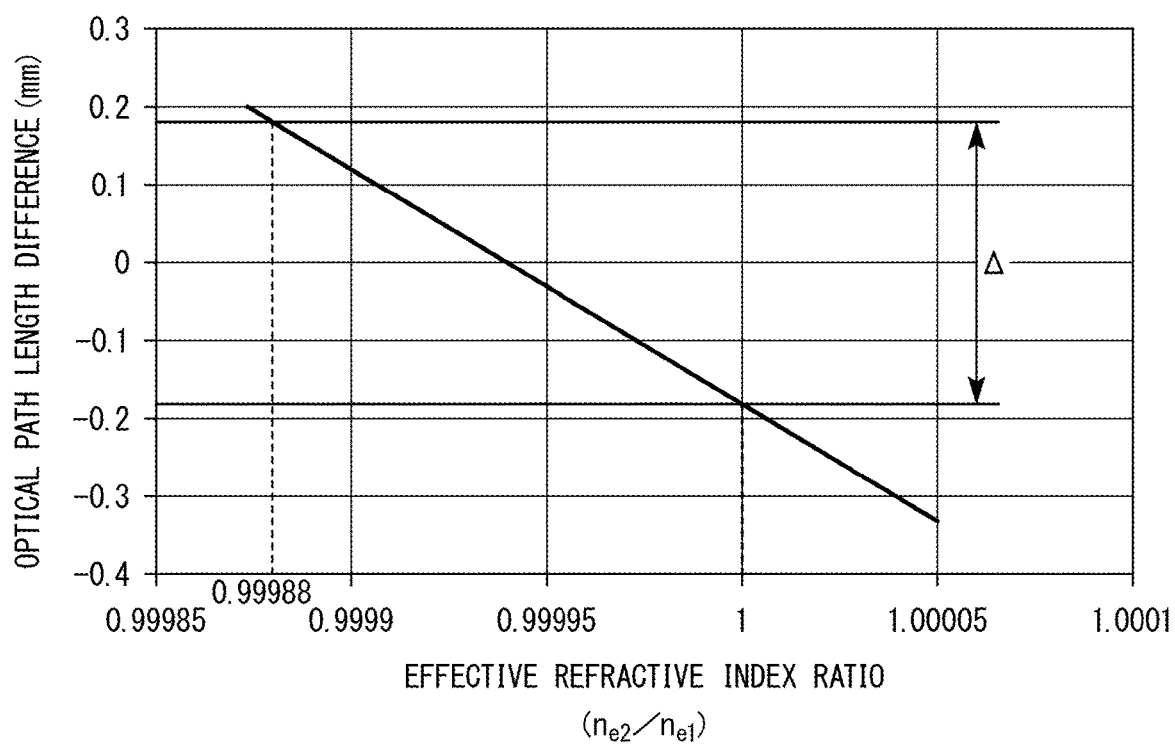
FIG. 5 is a diagram showing an example of characteristics of the optical fiber sensor according to one or more embodiments of the present invention.

FIG. 5 is a diagram showing an example of characteristics of the optical fiber sensor according to one or more embodiments of the present invention. Specifically, FIG. 5 is a diagram showing the relationship between the effective refractive index ratio ($n_{e2}/n_{e1}$) between the central core 11 and the outer peripheral core 12 and the optical path length difference between the central core 11 and the outer peripheral core 12. Further, in FIG. 5, the horizontal axis represents the effective refractive index ratio between the central core 11 and the outer peripheral core 12, and the vertical axis represents the optical path length difference between the central core 11 and the outer peripheral core 12.

The characteristics shown in FIG. 5 correspond to the case where the distance d between the central core 11 and the outer peripheral core 12 is 35 [µm], the length of one spiral of the outer peripheral core 12 in the longitudinal direction of the optical fiber sensor 1 is 20 [mm], and the total length of the optical fiber sensor 1 is 2 or more [m]. As shown in FIG. 5, the optical path length difference between the central core 11 and the outer peripheral core 12 is proportional to the effective refractive index ratio between the central core 11 and the outer peripheral core 12.

Here, as shown in FIG. 5, if the optical path length difference between the central core 11 and the outer peripheral core 12 is within the range indicated by A in FIG. 5, the optical path length difference becomes smaller than the optical path length difference therebetween in the case where the effective refractive indices of both are the same. Therefore, in the above case, it is desirable to set the effective refractive index ratio ($n_{e2}/n_{e1}$) between the central core 11 and the outer peripheral core 12 so as to satisfy the following expression.

$$0.99988 < (n_{e2}/n_{e1}) < 1$$

As described above, in one or more embodiments, the effective refractive index $n_{e1}$ of the central core 11 of the optical fiber sensor 1 and the effective refractive index $n_{e2}$ of the outer peripheral core are set so as to satisfy the above-described Expression (7). Therefore, the optical path length difference between the central core 11 and the outer peripheral core 12 can be made smaller than the optical path length difference A in the case where the effective refractive indices of the central core 11 and the outer peripheral core 12 are the same. Thus, even when the length of the optical fiber sensor 1 is increased, it is possible to realize high measurement accuracy over the entire length thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims. For example, in the above-described embodiments, an example in which the effective refractive index of the outer peripheral core 12 is adjusted by adjusting the concentration of germanium, which is a dopant having an effect of increasing the refractive index, has been described. However, the effective refractive indices of the outer peripheral cores 12a to 12c may be adjusted, by setting the concentrations of germanium to be doped to the central core 11 and the plurality of outer peripheral cores 12 to be the same, and doping a dopant (second dopant) having an effect of decreasing the refractive index, such as boron (B) and fluorine (F), to the plurality of outer peripheral cores 12a to 12c.

The method of adjusting the effective refractive indices of the central core 11 and the outer peripheral core 12 is not limited to a method of changing the concentration and type of dopants. For example, the effective refractive index may be adjusted by changing the diameters of the central core 11 and the outer peripheral core 12. Alternatively, for example, the effective refractive index may be adjusted by individually providing low refractive index layers around the outer peripheral cores 12a to 12c.

Further, in the above-described embodiments, the example in which the outer peripheral core 12 formed so as to spirally surround the central core 11 is configured with the three outer peripheral cores 12a to 12c has been described. However, the number of the outer peripheral cores 12 may be arbitrary and may be, for example, only one, or four or more. For example, assuming that the number of the outer peripheral cores 12 is six, it is desirable because the outer peripheral cores 12 can be close packed and arranged together with the center core 11, when viewed in the cross section of the optical fiber sensor 1.

In addition, in the above-described embodiments, in order to facilitate understanding, the example in which FBG is formed over the entire length in the longitudinal direction of the optical fiber sensor 1, in the central core 11 and the outer peripheral cores 12a to 12c of the optical fiber sensor 1 has been described. However, the FBGs are not necessarily formed over the entire length in the longitudinal direction of the optical fiber sensor 1, and it may be formed only in a partial region in the longitudinal direction.

In addition, the FBGs formed in the central core 11 and the outer peripheral cores 12a to 12c may have a constant period, or the period may be continuously changed (chirped grating). Further, the FBGs need not necessarily be formed on the central core 11 and the outer peripheral cores 12a to 12c of the optical fiber sensor 1, and the FBG may not be formed.

1 optical fiber sensor
11 central core
12 outer peripheral core
12a to 12c outer peripheral core

What is claimed is:
1. An optical fiber sensor comprising:
a central core disposed at a center of an optical fiber; and
an outer peripheral core that spirally surrounds the central core, wherein
Expression (1) is satisfied:

$$n_{e1} \times \left(\frac{1}{f_w} - B\right) < n_{e2} \times \left(\frac{1}{f_w} + A\right) < n_{e1} \times \left(\frac{1}{f_w} + B\right) \quad (1)$$

where d is a distance between the central core and the outer peripheral core, $f_w$ is a number of spirals of the outer peripheral core per unit length of the optical fiber, $n_{e1}$ is an effective refractive index of the central core, $n_{e2}$ is an effective refractive index of the outer peripheral core, $$A = \sqrt{\left(\frac{1}{f_w}\right)^2 + (2\pi d)^2} - \frac{1}{f_w},$$

and $$B = \frac{A}{1 + A \cdot f_w}.$$

2. The optical fiber sensor according to claim 1, wherein the effective refractive index $n_{e2}$ of the outer peripheral core is lower than the effective refractive index $n_{e1}$ of the central core, and a ratio between the effective refractive index $n_{e2}$ and the effective refractive index $n_{e1}$ matches a ratio between an optical path length of the central core and an optical path length of the outer peripheral core.

3. The optical fiber sensor according to claim 1, wherein a ratio between the effective refractive index $n_{e2}$ of the outer peripheral core and the effective refractive index $n_{e1}$ of the central core satisfies Expression (2):

$$\frac{n_{e2}}{n_{e1}} = \frac{\left(\frac{1}{f_w}\right)}{\sqrt{\left(\frac{1}{f_w}\right)^2 + (2\pi d)^2}}. \tag{2}$$

4. The optical fiber sensor according to claim 1, wherein a ratio between a molar concentration $m_1$ of a dopant of the central core and a molar concentration $m_2$ of a dopant of the outer peripheral core satisfies Expression (3):

$$\frac{m_2}{m_1} = \frac{\left(\frac{1}{f_w}\right)}{\sqrt{\left(\frac{1}{f_w}\right)^2 + (2\pi d)^2}}. \tag{3}$$

5. The optical fiber sensor according to claim 1, wherein the central core and the outer peripheral core are doped with a same concentrate of a first dopant, the first dopant is germanium, and the outer peripheral core is further doped with a second dopant that decreases a refractive index of the outer peripheral core.

6. The optical fiber sensor according to claim 1, wherein a Fiber Bragg Grating (FBG) is disposed over an entire length or a partial region of the optical fiber in a longitudinal direction of the optical fiber.

7. The optical fiber sensor according to claim 6, wherein the effective refractive index nee of the outer peripheral core and the effective refractive index $n_{e1}$ of the central core satisfies Expression (2) to correct a difference between a period of a FBG formed in the central core and a period of a FBG formed along the outer peripheral core:

$$\frac{n_{e2}}{n_{e1}} = \frac{\left(\frac{1}{f_w}\right)}{\sqrt{\left(\frac{1}{f_w}\right)^2 + (2\pi d)^2}}. \tag{2}$$

* * * * *